(12) United States Patent
Chen et al.

(10) Patent No.: US 12,737,727 B2
(45) Date of Patent: Sep. 15, 2026

(54) MACHINE LEARNING APPARATUS AND METHODS FOR PREDICTING HIRING PROGRESSIONS FOR DEMOGRAPHIC CATEGORIES PRESENT IN HIRING DATA

(71) Applicant: iCIMS, Inc., Holmdel, NJ (US)

(72) Inventors: Shiying Chen, Highland Park, NJ (US); Amber M. Brown, Keyport, NJ (US)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 17/469,468

(22) Filed: Sep. 8, 2021

(65) Prior Publication Data

US 2023/0076049 A1 Mar. 9, 2023

(51) Int. Cl.

*G06Q 10/1053* (2023.01)
*G06F 17/11* (2006.01)
*G06F 18/2431* (2023.01)
*G06N 20/00* (2019.01)
*G06Q 10/04* (2023.01)

(Continued)

(52) U.S. Cl.

CPC ......... *G06Q 10/1053* (2013.01); *G06F 17/11* (2013.01); *G06F 18/2431* (2023.01); *G06N 20/00* (2019.01); *G06Q 10/04* (2013.01); *G06Q 10/063118* (2013.01); *G06Q 10/06375* (2013.01)

(58) Field of Classification Search

CPC ......... G06Q 10/1053; G06Q 10/06375; G06K 9/628

See application file for complete search history.

(56) References Cited

U.S. PATENT DOCUMENTS 11,030,404 B1 * 6/2021 Garg ..................... G06F 40/289
11,645,626 B2 5/2023 Mihai et al.
2014/0046956 A1 2/2014 Zenger et al.

(Continued)

FOREIGN PATENT DOCUMENTS

WO WO-2021141567 A1 7/2021

OTHER PUBLICATIONS

A. Peng, B. Nushi, E. Kiciman, K. Inkpen, S. Suri, E. Kamar, "What You See Is What You Get? The Impact of Representation Criteria on Human Bias in Hiring", 2019, Microsoft Research, pp. 1-11, doi: 10.48550/arXiv.1909.03567 (Year: 2019).*

(Continued)

*Primary Examiner* — Lynda Jasmin
*Assistant Examiner* — Ehrin L Pratt
(74) *Attorney, Agent, or Firm* — COOLEY LLP

(57) ABSTRACT

In some embodiments, a method can include receiving, during a hiring process, a set of candidate profiles associated with job information, a first slate goal for a first protected class, and a second slate goal for a second protected class. The method can further include extracting slate demographic data from the set of candidate profiles. The method can further include executing a trained machine learning model based on the first slate goal and the slate demographic data to predict a first hiring progression $x_1$, and based on the second slate goal and the slate demographic data to predict a second hiring progression $x_2$. The method can further include generating, after predicting the first hiring progression and the second hiring progression, updated job information based on the job information, the first slate goal, the first hiring progression, the second slate goal, and the second hiring progression.

19 Claims, 4 Drawing Sheets

(51) Int. Cl.
*G06Q 10/0631* (2023.01)
*G06Q 10/0637* (2023.01)

(56) References Cited

U.S. PATENT DOCUMENTS

2014/0236664 A1 8/2014 Zenger et al.
2015/0112983 A1* 4/2015 Srivastava ............ G06Q 10/10 707/732
2015/0170065 A1 6/2015 Zenger et al.
2015/0193719 A1 7/2015 Than et al.
2015/0248644 A1 9/2015 Zenger et al.
2016/0217400 A1 7/2016 Sit et al.
2016/0217401 A1 7/2016 Leung et al.
2017/0103368 A1* 4/2017 Gupta ................ G06Q 10/1093
2017/0206545 A1 7/2017 Gupta et al.
2018/0307750 A1 10/2018 Gupta et al.
2018/0357266 A1 12/2018 Zenger et al.
2018/0357267 A1 12/2018 Zenger et al.
2019/0043070 A1* 2/2019 Merrill ...................... G06F 9/54
2019/0066056 A1* 2/2019 Gomez ............ G06Q 10/06393
2019/0102742 A1* 4/2019 Agrawal ................ G06Q 10/10
2020/0065769 A1 2/2020 Gupta et al.
2020/0272993 A9 8/2020 Gupta et al.
2021/0096869 A1 4/2021 Mkrtchyan et al.
2021/0117718 A1* 4/2021 Badjatiya ............. G06K 9/6287
2021/0383229 A1* 12/2021 Hanna ................ G06Q 10/1053

OTHER PUBLICATIONS

Diversity Best Practices, Diverse Slates & Building Accountability in Recruitment and Hiring, DBP Research Request, 2020, 13 pages.
International Search Report and Written Opinion for International Application No. PCT/US2022/042927, dated Nov. 29, 2022, 18 pages.
International Preliminary Report on Patentability for International Application No. PCT/US2022/042927 dated Mar. 21, 2024, 13 pages.

* cited by examiner

Figure 2:
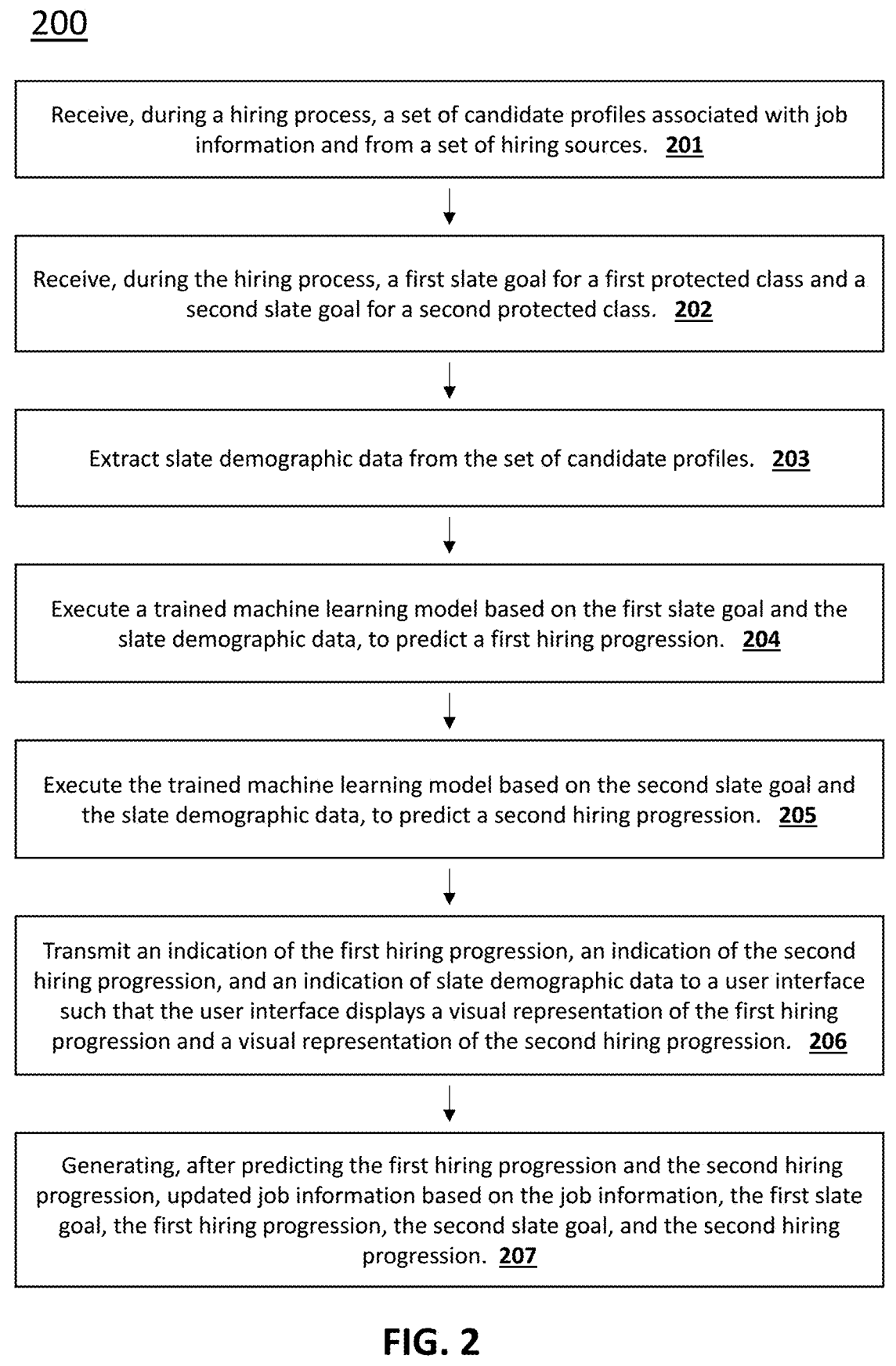

200

Receive, during a hiring process, a set of candidate profiles associated with job information and from a set of hiring sources. 201

↓

Receive, during the hiring process, a first slate goal for a first protected class and a second slate goal for a second protected class. 202

↓

Extract slate demographic data from the set of candidate profiles. 203

↓

Execute a trained machine learning model based on the first slate goal and the slate demographic data, to predict a first hiring progression. 204

↓

Execute the trained machine learning model based on the second slate goal and the slate demographic data, to predict a second hiring progression. 205

↓

Transmit an indication of the first hiring progression, an indication of the second hiring progression, and an indication of slate demographic data to a user interface such that the user interface displays a visual representation of the first hiring progression and a visual representation of the second hiring progression. 206

↓

Generating, after predicting the first hiring progression and the second hiring progression, updated job information based on the job information, the first slate goal, the first hiring progression, the second slate goal, and the second hiring progression. 207

Retrieve a first set of slate goals. Each slate goal from the first set of slate goals associated with a protected class from a set of protected classes. 301

Retrieve first timestamped slate demographic data associated with the set of protected classes. 302

Associate the first timestamped slate demographic data and the first set of slate goals with a set of hiring progression labels to generate labeled training data. 303

Train a machine learning model based on the labeled training data to produce a trained machine learning model. 304

Retrieve (1) a second set of slate goals different from the first set of slate goals and (2) second timestamped slate demographic data associated with the second set of slate goals. Each slate goal from the second set of slate goals associated with a protected class from the set of protected classes. 305

Execute the trained machine learning model based on the second set of slate goals and the second timestamped slate demographic data, to predict a set of hiring progressions for the set of protected classes. 306

Display a visual representation for each hiring progression from the set of hiring progression. 307

FIG. 3

| Submittal Candidate Gender | slate goal | est applications to meet goal | Finish Application | Interview | percent completed | Interview Rate | Category Interview Rate | Interview rate est |
|---|---|---|---|---|---|---|---|---|
| Female | 30 | 484 | 242.00 | 15.00 | 50.00% | 0.0620 | 0.1084 | 0.0620 |
| Male | 25 | 577 | 254.00 | 11.00 | 44.00% | 0.0433 | 0.1045 | 0.0433 |
| Opt Out | | | 12.00 | 2.00 | | 0.1667 | 0.0860 | 0.1667 |

MACHINE LEARNING APPARATUS AND METHODS FOR PREDICTING HIRING PROGRESSIONS FOR DEMOGRAPHIC CATEGORIES PRESENT IN HIRING DATA

TECHNICAL FIELD

The present disclosure relates to the field of data processing and artificial intelligence including, for example, apparatus and methods for predicting a hiring progression(s) for a given demographic category(ies) (e.g., a population group defined by education, nationality, religion, ethnicity, etc.) present in hiring data (e.g., job candidate profiles, resumes, etc.).

BACKGROUND

Although some known hiring methods and apparatus use computer processes and methods for selecting candidates and monitoring candidate profiles, they, nevertheless, do not provide their users with actionable information regarding inclusiveness of their hiring process across candidate demographic categories. Information about inclusiveness of hiring process is important because such information can help recruiters, business owners, and/or hiring managers to observe whether their hiring process is inclusive and is projected to meet or achieve a given a hiring goal. Thus, a need exists for apparatus and methods for predicting hiring progression for a given demographic(s).

SUMMARY

In some embodiments, a method can include receiving, during a hiring process, a set of candidate profiles associated with job information, a first slate goal for a first protected class, and a second slate goal for a second protected class. The method can further include extracting slate demographic data from the set of candidate profiles. The method can further include executing a trained machine learning model based on the first slate goal and the slate demographic data to predict a first hiring progression $x_1$, and based on the second slate goal and the slate demographic data to predict a second hiring progression $x_2$. The method can further include generating, after predicting the first hiring progression and the second hiring progression, updated job information based on the job information, the first slate goal, the first hiring progression, the second slate goal, and the second hiring progression.

BRIEF DESCRIPTION OF THE DRAWINGS

FIG. 2 is a flowchart of a method for predicting a hiring progression toward slate goals based on slate demographic data, according to an embodiment.

FIG. 3 is a flowchart of a method for predicting a hiring progression toward slate goals based on timestamped slate demographic data, according to an embodiment

DETAILED DESCRIPTION

Figure 1:
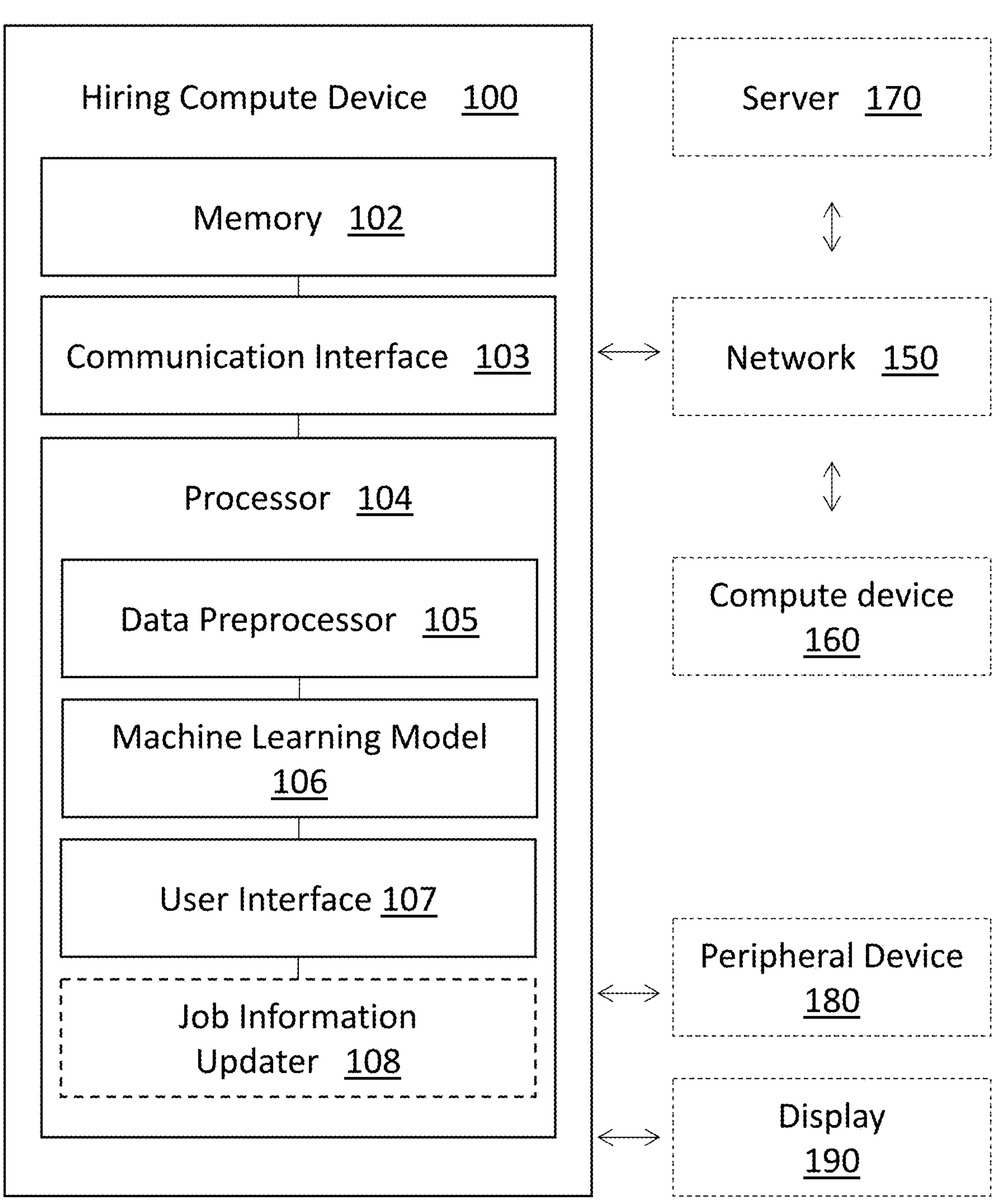
FIG. 1 is a block diagram of a hiring compute device for predicting a hiring progression, according to an embodiment.

Non-limiting examples of various aspects and variations of the embodiments are described herein and illustrated in the accompanying drawings.

Some known hiring methods and apparatus use computer-based methods that can generate and display hiring information about demographics of job candidates in a hiring process for a job opportunity using external data. That is, those computer-based methods can end up processing data that is not directly relevant to the hiring process and the job opportunity. As a result, the computer-based methods often lack an ability to capture a goal and predict/forecast a likelihood of meeting that goal. Some known hiring methods and apparatus use computer-based methods that can estimate a likelihood of workforce diversity based on what-if hiring scenarios. Such estimations, however, are not actionable in a hiring process, and therefore, lack an ability to capture a goal and forecast a likelihood of meeting that goal before the hiring process is completed. Currently, no known hiring methods and apparatus exist that can provide a user(s) (e.g., recruiters, business owners, hiring managers, etc.) with a capability to set one or more hiring goals (e.g., goals to attract, select, interview, and/or hire inclusively across one or more demographics defined by education, nationality, religion, ethnicity, etc.) for a given job opportunity and to forecast a likelihood to meet those goals during an interim period of the hiring process.

One or more embodiments described herein generally relate to apparatus and methods of predicting, during a hiring process and in substantially real-time, one or more hiring progressions toward one or more hiring goals (e.g., inclusiveness goals, diversity goals, application number goals, interview goals, hiring goals, etc.). To solve the above-mentioned challenges in estimating and monitoring the hiring progression, the apparatus and methods described herein can use, for example, a machine learning model that can estimate, in substantially real-time, a hiring progression for a given demographic at a given time. The hiring process can begin, for example, with generating a job description for a job opportunity and can end, for example, when a hiring progression is complete (e.g., the hiring progression reaches 100% completion, the hiring progression reaches a threshold completion (e.g., 85%), when at least one candidate to whom an offer is made for the job opportunity is hired, and/or the like).

While the methods and apparatus are described herein as processing data from document files, text files, scanned images, image files, and/or the like, in some instances, a hiring compute device for estimating and monitoring a hiring progression (e.g., hiring compute device 100 described below in connection with FIG. 1) can be used to generate the document files, the text files, the scanned images, the image files, and/or the like. For example, in some instances, the compute device can generate a job description document (e.g., a job description file in a portable document format (PDF) format, an Office Open Extensible Markup Language (docx) format, etc.) during a hiring process. The compute device can also update the job description document to produce, during the hiring process, an updated job description to improve or speed-up a progression of hiring process for a demographic category(ies) with relatively slow hiring progression.

FIG. 1 is a schematic description of a hiring compute device 100 for estimating and monitoring a hiring progression, according to an embodiment. The hiring compute device 100 can optionally be coupled to a compute device 160 and/or a server 170, to transmit and/or receive data, representation of slate goals (e.g., inclusiveness goals, diversity goals, application number goals, interview goals, hiring goals, etc.), machine learning models, and/or the like, via a network 150. The hiring compute device 100, the compute device 160, and the server 170 each can be/include a hardware-based computing device and/or a multimedia device, such as, for example, a computer, a desktop, a laptop, a smartphone, and/or the like. The hiring compute device 100 includes a memory 102, a communication interface 103, and a processor 104. In some implementations, the hiring compute device 100 can optionally be coupled to a peripheral device 180 (e.g., a keyboard, a mouse, a touch screen, a gesture sensor, a microphone, etc.) to receive, via the peripheral device 180, input from a user of the hiring compute device 100. In some implementations, the hiring compute device 100 can optionally be coupled a to a display 190 (e.g., a monitor, a virtual reality headset, a projector, etc.) to show a user interface to the user.

The hiring compute device 100 can operate a data preprocessor 105, a machine learning model 106, and a user interface 107 that collectively can estimate and present one or more hiring progressions for one or more demographics during a hiring process. Moreover, in some implementations, the hiring compute device 100 can optionally operate a job information updater 108 that can update a job description based on the estimated one or more hiring progression, for example, to improve at least one hiring progression in a demographic from the one or more demographics.

The hiring compute device 100 can receive, via the communication interface 103, data including, for example, one or more slate goals, one or more representations of candidate profiles (e.g., web-based candidate profiles), one or more representations of job candidate resume documents (e.g., a resume document file), one or more representation of job information, one or more representation of job descriptions (e.g., a job posting link, a job description text), one or more representation of job titles, one or more representation of job locations, and/or the like, from a hiring source (e.g., a compute device of a third-party recruiter, a third-party resume database, the server 170, the compute device 160, a peripheral device such as a scanner (not shown), and/or the like). In some implementations, the hiring compute device 100 can generate all or a subset of the one or more slate goals, all or a subset of the one or more representations of candidate profiles, all or a subset of the one or more representations of job candidate resume documents, all or a subset of the one or more representation of job information, all or a subset of the one or more representation of job descriptions, all or a subset of the one or more representation of job titles, all or a subset of the one or more representation of job locations, and/or the like. The data received from the data source(s) can be stored in the memory 102 of the hiring compute device 100 and be processed or analyzed using the processor 104. The hiring compute device 100 can begin receiving the data in response to a user (e.g., a hiring manager, a business owner, a human resource team member, etc.) of the hiring compute device 100 and/or the compute device 160 providing an indication to begin a hiring process.

The memory 102 of the hiring compute device 100 can be, for example, a memory buffer, a random-access memory (RAM), a read-only memory (ROM), a hard drive, a flash drive, and/or the like. The memory 102 can store, for example, the one or more slate goals, the one or more representations of candidate profiles, the one or more representations of job candidate resume documents, the one or more representation of job information, the one or more representation of job descriptions, the one or more representation of job titles, the one or more representation of job locations, software codes that includes software instructions to cause the processor 104 to perform one or more processes or functions (e.g., as performed by the data preprocessor 105, the machine learning model 106, and the user interface 107), and/or the like. The memory 102 can store a set of files associated with (e.g., generated by executing) the data preprocessor 105, the machine learning model 106, and/or the user interface 107. For example, executing the machine learning model 106 can cause the generation of temporary variables, return memory addresses, variables, a graph of the machine learning model 106 (e.g., representations of a set of arithmetic operations), the graph's metadata, assets (e.g., external files or pointers to external files), electronic signatures (e.g., specifying a type of the machine learning model and the input/output tensors), a list of selected candidates, memory addresses of the list of selected candidates, and/or the like, generated during the operation of the machine learning model 106.

The communication interface 103 of the hiring compute device 100 can be a hardware component of the hiring compute device 100 to facilitate data communication between the hiring compute device 100 and external devices (e.g., the network 150, the compute device 160, the server 170, and/or the like). The communication interface 103 is operatively coupled to and used by the processor 104 and/or the memory 102. The communication interface 103 can be, for example, a network interface card (NIC), a Wi-Fi® transceiver, a Bluetooth® transceiver, an optical communication module, and/or any other suitable wired and/or wireless communication interface. The communication interface 103 can be configured to connect the hiring compute device 100 to and facilitate receiving and/or transmitting data via to the network 150. For example, the communication interface 103 can facilitate receiving or transmitting the one or more representations of candidate profiles, the one or more representations of job candidate resume documents, the one or more representation of job information, the one or more representation of job descriptions, the one or more representation of job titles, the one or more representation of job locations, the software codes/instructions, and/or the like, from/to the compute device 160, or the server 170, each communicatively coupled to the hiring compute device 100 via the network 150.

The network 150 can be, for example, a digital telecommunication network of servers and/or compute devices. The servers and/or computes device on the network 150 can be connected via one or more wired or wireless communication networks (not shown) to share resources such as, for example, data storage and/or computing power. The wired or wireless communication networks between servers and/or compute devices of the network 150 can include one or more communication channels, for example, a radio frequency (RF) communication channel(s), a fiber optic commination channel(s), an electronic communication channel(s), and/or the like. The network 150 can be and/or include, for example, the Internet, an intranet, a local area network (LAN), and/or the like.

The processor 104 can be, for example, a hardware-based integrated circuit (IC) or any other suitable processing device configured to run or execute a set of instructions or a set of software codes. For example, the processor 104 can include a general-purpose processor, a central processing unit (CPU), an application specific integrated circuit (ASIC), a graphics processing unit (GPU), and/or the like. The processor 104 is operatively coupled to the memory 102 through a system bus (for example, address bus, data bus, and/or control bus; not shown) and can read, for example, first data, first software codes, and/or first models stored in the memory 102 and/or write second data, second software codes, and/or second models to the memory 102. In one example, the processor 104 can read and analyze a representation of a job descriptions, a representation of slate goals, and timestamped slate demographic data, to forecast a likelihood of meeting the slate goal and/or to generate an updated job information (e.g., updated job description, updated job title, updated job location, etc.; to improve the likelihood of meeting the slate goal), and write the updated job information to the memory 102.

The processor 104 includes the data preprocessor 105, the machine learning model 106, and the user interface 107. The processor 104 can further optionally include a job information updater 108. Each of the data preprocessor 105, the machine learning model 106, and the user interface 107 can include software stored in the memory 102 and executed by the processor 104. For example, a code to cause the machine learning model 106 to generate a likelihood of meeting the slate goal for a job description, can be stored in the memory 102 and executed by the processor 104. Alternatively, each of the data preprocessor 105, the machine learning model 106, and the user interface 107, and the job information updater 108 can be a hardware-based device (e.g., an integrated circuit).

The data preprocessor 105 is operatively coupled to the machine learning model 106 and the user interface 107 and is optionally coupled to the job description updater 108. The data preprocessor 105 can receive data that can include, for example, the one or more representations of candidate profiles, the one or more representations of job candidate resume documents, the one or more representations of job information, the one or more representation of job descriptions, the one or more representation of job titles, the one or more representation of job locations, and/or the like, from the memory 102 and/or from external resources (the server 170, the compute device 160, the peripheral device 180, and/or the like). In one example, the data preprocessor 105 can receive representations of a set of candidate profiles from a set of hiring sources (e.g., resume databases, university career centers, recruiter compute devices, job candidate compute devices, etc.). In some instances, the data can be used for training the machine learning model 106, as described in further details herein. In some instances, the data can be used for executing the machine learning model 106, as described in further details herein.

The data preprocessor 105 can extract slate demographic data from the one or more representations of candidate profiles, the one or more representations of job candidate resume documents, and/or the like. Slate demographic data of a candidate profile can indicate, for example, demographic information related to education, nationality, religion, ethnicity, race, color, national origin, political party, etc. For example, in some instances, the data preprocessor 105 can use a computer-based search method (e.g., a linear search, a sub-list search, a Fibonacci search, etc.) in text (e.g., generated using an optical character recognition (OCR) model) of the one or more representations of candidate profiles and/or the one or more representations of job candidate resume documents, to extract slate demographic data related to, for example, education (law degree, technical degree, professional certificate, etc.), nationality (American, Chinese, Russian, etc.), religion (Christian, Muslim, Buddhist, etc.), ethnicity (Native American, Hispanic, Caucasian, etc.), color (white, black, brown, etc.), national origin (France, South Africa, Japan), political party (Democrat, Liberal, Republican, etc.), and/or the like, of job candidates. In some instances, demographic information can be directly provided by the job candidates (e.g., during an application form submission), indirectly provided by a third-party database (e.g., stored in the server 170; that the user has authorized the hiring compute device 100 to access), or chosen by a subset of candidates not to be provided (e.g., opt-out to disclose information with regard to race, religion, etc.).

In some instances, the data preprocessor 105 can be configured to prepare (e.g., render or generate) from the data a set of candidate profiles (resume document image files, PDF files, DOCX files, and/or the like) that have a standardized format. Furthermore, in some instances, the data preprocessor 105 can be configured to prepare (generate), from the data, a set of job descriptions that have a standardized format. The standardized format can establish common attributes (e.g., a common background color, a common font, etc.), and therefore, streamline analyzing the data. The standardized format of the set of job candidate profiles can further improve cross-compatibility of the set of candidate profiles among various software codes, processes, and/or models of the hiring compute device 100.

For example, in some instances, a user of the hiring compute device 100 can receive one or more printed resume documents that are often semi-structured and/or unstructured. The user can scan the one or more printed resume documents, using a scanner (not shown) that is operatively coupled to the hiring compute device 100, to produce the one or more representations of job candidate resume documents that are also semi-structured and/or unstructured. The data preprocessor 105 can receive the one or more representations of job candidate resume documents, identify (e.g., using a natural language processing model) and correlate entities (e.g., company names, individual names, skills, job titles, universities, etc.) in the text of the resume document images to extract structured and machine-indexable data and to standardize the one or more representations of job candidate resume documents.

In some implementations, the hiring compute device 100 can optionally include a statistical model (not shown; e.g., a convolutional neural network) that can identify and correlate entities from visual characteristics of the one or more representations of job candidate resume documents (e.g., resume images). Therefore, the statistical model can classify paragraphs of structured, semi-structured, and/or unstructured resume document images (e.g., to correctly classify candidate profiles regardless of a language(s) of and/or a spelling error(s) in the documents) as described in U.S. patent application Ser. No. 17/319,894, filed on May 13, 2021 and entitled "Machine Learning Based Classification and Annotation of Paragraph of Resume Document Images Based on Visual Properties of the Resume Document Images, and Methods and Apparatus for the Same," which is incorporated herein in its entirety by this reference.

In some implementations, the hiring compute device 100 can optionally include data augmenter (not shown) that can synthetically generate augmented candidate profiles from the one or more representations of candidate profiles and/or augmented job information from the one or more representations of job information. Augmenting data, as described herein, can increase number and variety of training data used for training the machine learning model 106 and, therefore, improve an accuracy and/or generalizability of the machine learning model. In some instances, synthetically generating augmented candidate profiles and/or augmented job information may involve applying an image filter to a candidate profile image, adding noise (e.g., a random noise) to the candidate profile image, translating a text of a candidate profile, synonym-replacing the text, changing a demographic information of a candidate, and/or the like.

The machine learning model 106 is operatively coupled to the data preprocessor 105 and the user interface 107 and is optionally coupled to the job description updater 108. The machine learning model 106 can be configured, as described herein, to analyze a set of candidate profiles, a set of job information, and a set of slate goals, to predict (e.g., during the hiring process) a hiring progression and/or to generate a likelihood (e.g., a probability value from 0 to 1) of achieving the set of slate goals. In some implementations, the machine learning model 106 can include, for example, a deep neural network model (DNN), an artificial neural network (ANN) model, a fully connected neural network, a convolutional neural network (CNN), a residual network model, a region proposal network (RPN) model, a generative adversarial network (GAN), a K-Nearest Neighbors (KNN) model, a Support Vector Machine (SVM), a decision tree, a random forest, a boosting model, and/or the like. The machine learning model 106 includes a set of model parameters (e.g., weights, biases, activation functions, and/or the like) that can be executed to perform arithmetic operations and/or logical functions on the set of candidate profile, the set of job information, and the set of slate goals, to predict (e.g., during the hiring process) the hiring progression and/or to generate the likelihood of achieving the set of slate goals.

The machine learning model 106 can be operated in a training phase and in an execution phase. During the training phase, the machine learning model 106 receives training data (including candidate profile, job information, and slate goals) in batches and in multiple iterations. At each iteration, the set of model parameters of the machine learning model 106 is adjusted using an optimization function (e.g., a stochastic gradient descent) to reduce a cost function (e.g., a mean squared error (MSE) of an output of the machine learning model 106 at each iteration compared to truth value labels provided in the training data). In one example, the training data can include past candidate profile, past job information, past slate goals, and progression labels (e.g., each indicating a progression value toward a slate goal). In another example, the training data can include features from past candidate profiles (e.g., demographic information of candidates), features from past job information (e.g., job description), features from past slate goals (e.g., interview goals), and progression labels.

During the execution phase, the machine learning model 106 can receive from the memory 102, the compute device 160 and/or the server device 170 data for a job opportunity, that is not included in the training data. The data received during the execution phase can include, for example, a set of candidate profiles, a set of job information, and a set of slate goals. The machine learning model 106 can generate a hiring progression and/or a likelihood of achieving the set of slate goals in substantially real-time (e.g., 100 milliseconds, 200 milliseconds, 1 second, 2 seconds, 10 seconds, etc.) whenever a user of the hiring compute device provides an indication (e.g., providing a command via the peripheral deice 180) for monitoring the hiring progression for that job opportunity. The term "substantially real-time" can refer, for example, to the processing time and/or the network latency associated with generating a hiring progression and/or a likelihood of achieving the set of slate goals.

For example, in some instances, the machine learning model 106 can receive, from the server 170 and via the network 150, a set of candidate profiles that applied for a job opportunity (e.g., data scientist) with a job information (e.g., including a job description, a job title, and a job location). The machine learning model 106 can also receive a set of slate goals provided, for example, by a user of the hiring compute device 100. The set of slate goal can indicate, for example, hiring 40 female candidates, 20 male candidates, 50 candidates graduated from George Washington University, and 10 candidates graduated from Georgetown University. The machine learning model 106 (which is executed after being trained based on the training data) can generate/predict (e.g., during the hiring process) a progression value for each slate goal from the set of slate goals.

Figure 4:
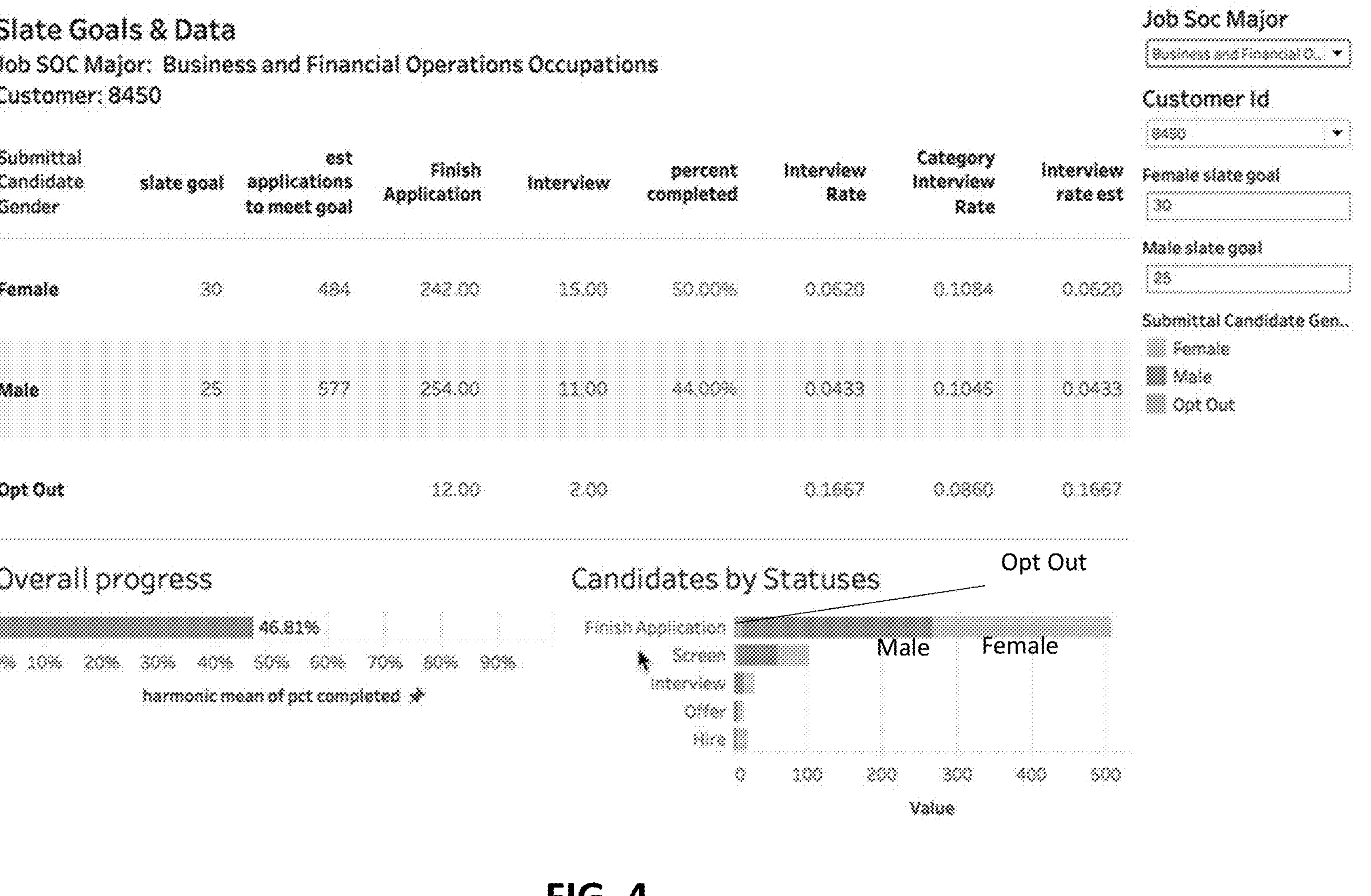
FIG. 4 is a schematic description of a user interface of a hiring compute device, according to an embodiment.

The user interface 107 is operatively coupled to the data preprocessor 105 and the machine learning model 106 and is optionally coupled to the job description updater 108. The user interface 107 can include (e.g., to provide to the display 190) a set of graphical elements to display the slate goals, the hiring progression for each slate goal, an overall progress, one or more drop down menus (e.g., to select a job sector, job category, etc.), one or more input fields (e.g., to enter customer identification, slate goals, etc.), and/or the like. An example of the user interface 107 is shown in FIG. 4. The user interface can be an interactive user interface. The interactive user interface can receive an input from the user of the hiring compute device 100, execute software codes and models (e.g., the machine learning model 106) in response to the input in substantially real-time (e.g., 100 milliseconds, 200 milliseconds, 1 second, 2 seconds, 10 seconds, etc.), and update displayed information in the user interface based on executing the code.

In some implementations, the processor 104 can optionally include a job information updater 108. The job information updater 108 can be operatively coupled to the data preprocessor 105, the machine learning model 106, and the user interface 107. In some instances, the job description updater 108 can include a natural language processing model that can automatically generate updated job information (e.g., an updated job description, an updated job title, an updated job location, and/or the like) based on an output of the machine learning model (e.g., a progression value, a likelihood of achieving a slate goal, and/or the like). In some instances, the job description updater 108 can include a model that can suggest and highlight a set of terms that if changed could improve the hiring progression and/or to the likelihood of achieving the set of slate goals. In some instances, the job description updater 108 can generate a signal to display, using the user interface 107, the job information and the hiring progression to a user of the hiring compute device 100, and receive, during the hiring process, the updated job information from the user of the hiring compute device 100. For example, the updated job information can include an updated job description, an updated job title, an updated salary range, and/or the like. The job information updater 108 can then substitute, during the hiring process, the job information with the updated job information such that the likely outcome of the overall hiring process and/or the hiring progression is improved based on the updated job information.

The compute device 160 can be/include a hardware-based computing device and/or a multimedia device of a recruiter, a job candidate, or a remote user of the hiring compute device 100. The compute device 160 can be configured to transmit and/or receive data (e.g., resume documents, candidate profiles, job information, slate goals, and/or the like) to/from the hiring compute device 100. For example, in some implementations, the compute device 160 can be a device of a job candidate that can receive a representation of a job description and transmit a representation of a resume document, a representation of a transcript, and/or the like, to the hiring compute device 100. The compute device 160 can include a memory, a communication interface and/or a processor that are structurally and/or functionally similar to the memory 102, the communication interface 103 and/or the processor 104 as shown and described with respect to the hiring compute device 100.

The server 170 can be/include a compute device medium particularly suitable for data storage purpose (e.g., storing training data that can include large number of past candidate profiles, job information, slate goals, and/or the like) and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory, a communication interface and/or a processor that are structurally and/or functionally similar to the memory 102, the communication interface 103 and/or the processor 104 as shown and described with respect to the hiring compute device 100. In some embodiments, however, the memory of the server 170 can include application specific storage (e.g., deep learning storage servers) that is structurally and/or functionally different from the memory 102. Similarly, in some implementations, the processor of the server 170 can include application specific processors (e.g., GPU rack servers) that are structurally and/or functionally different from the processor 104.

In use, the hiring compute device 100 can receive (e.g., from a user of the hiring compute device 100) job information for a job opportunity. The job information can include, for example, a job description, a job geolocation, a salary range, a job title, an industry type, an occupation type, a company size, a job posting timeframe, and/or the like. During a hiring process for the job opportunity, the hiring compute device 100 can receive, from a set of hiring sources (e.g., the compute device, the server device, and/or the like), a set of candidate profiles (e.g., a set of resume documents, a set of application packages, a set of transcripts, and/or the like) associated with the job information. In some instances, for example, the job information can include a customer identification and/or a job identification that is associated with and uniquely identifies the job opportunity. The set of candidate profiles can include, for example, a copy of the customer identification and/or the job identification to be associated with that job opportunity.

The hiring compute device 100 can receive a set of slate goals for a set protected classes (e.g., protected classes based on race, gender, religion, country of origin, and/or the like), a set of demographics (e.g., a marital status, an income level, an education level, an employment status, and/or the like), a set of hiring preferences (e.g., alumni of a university, alumni of a high school, affiliation with a society, fraternities, sororities, and/or the like), and/or the like. The set of slate goals can, for example, indicate a target number of individuals to be hired from each protected class, each demographic, each hiring preference, and/or the like.

The data preprocessor 105 can receive the set of candidate profiles and extract (e.g., using a computer-based search method and/or a feature extraction machine learning model) slate demographic data from the set of candidate profiles. The slate demographic data can be referred to as features among the set of candidate profiles that directly indicate or indirectly suggest that a candidate is, for example, part of the set of protected classes, the set of demographics, the set of hiring preferences, and/or the like. In one example, a first candidate profile from the set of candidate profiles can directly indicate being a female. Therefore, the data preprocessor 105 can extract slate demographic data of the first candidate profile using a computer-based search method. In another example, a second candidate profile from the set of candidate profiles can indirectly suggest a particular religious affiliation (e.g., by including one or more volunteer activities for that particular religious affiliation (e.g., Buddhism, Christianity, Islam, etc.). Therefore, the data preprocessor 105 can extract slate demographic data of the second candidate profile using a feature extraction machine learning model (not shown).

In some instances, the data preprocessor 105 can calculate a set of slate demographic metrics based on the slate demographic data and/or an indication of the slate demographic data. The set of slate demographic metrics can include, for example, a set of numerical values associated with demographic categories among the set of candidate profiles. For example, the set of slate demographic metrics can include a first number representing a number of male candidates, a second number representing a number of female candidates, a third number representing a number of Asian candidates, a fourth number representing a number of Native American candidates, and/or the like. In some instances, the data preprocessor 105 can additionally standardize the set of candidate profiles to be more easily processed by the machine learning model 106. In some instances, the data preprocessor 105 can additionally augment the set of candidate profiles to generate training data for training and/or fine-tuning the machine learning model 106.

The machine learning model 106 can be executed to generate a set of hiring progressions and/or a set of likelihoods (e.g., probability values from 0 to 1, probability percentages from 0 to 100) of achieving the set of slate goals, based on the set of slate goals and the slate demographic data extracted from the set of candidate profiles. In some instances, the machine learning model 106 can be configured to generate the set of hiring progressions and/or the set of likelihoods based on the set of slate goals, the set of candidate profiles (e.g., directly and without the extracted demographic data), and/or the set of slate demographic metrics calculated from an statistical analysis of the set of candidate profiles.

In some implementations, the machine learning model 106 can also generate an overall progression and/or an overall likelihood that takes into account all or a subset of slate goals among the set of slate goals. In some implementations, progression values predicted by and/or likelihood values estimated by the machine learning model 106 can be used to calculate (e.g., weight averaged) the overall progression. For example, in some instances, the overall progression can be calculated using the equation:

$$\frac{n}{\frac{1}{x_1}+\frac{1}{x_2}+\ldots+\frac{1}{x_n}}=\frac{n}{\sum_{i=1}^{n}\frac{1}{x_i}}$$

where $x_i$ represents a progression (e.g., a progression percentage) for a slate goal from the set of slate goals and n represents number of slate goals in the set of slate goals.

The user interface 107 can then transmit an indication of the set of progressions and/or an indication of slate demographic data (also referred to as the "slate demographic metrics") to a graphical user interface to be displayed on a display 190. The indication of slate demographic data can, for example, include numerical values for frequency of slate demographic data for each category among the set of protected classes, the set of demographics, the set of hiring preferences, and/or the like. The user interface can display a visual representation of the set of progressions (e.g., displaying a progression bar) and/or a visual representation of the indication of slate demographic data (e.g., a histogram). In some instances, the user interface 107 can include an inclusion meter that can display a set of inclusion metrics calculated based on at least the slate demographic data and the set of slate goals.

The inclusion metrics can include, for example, interview rate estimates for a job category, interview rate estimates for a job, estimate number of applications to meet a slate goal, and/or a completion percentage value.

The interview rate estimates for a job category of a customer (e.g., an employer) can be calculated, for example, using the equation:

$$\text{Interview rate estimate of a demographic group for a job category} = \frac{\text{Number of interviews of the demographic group for the job category}}{\text{Number of Applications of the demographic group for the job category}}$$

The interview rate estimates for a given job can be calculated, for example, using the equation:

$$\text{Interview rate estimate of a demographic group for a job} = \frac{\text{Number of interviews of the demographic group for the job}}{\text{Number of Applications of the demographic group for the job}}$$

The estimate number of applications to meet a slate goal for a demographic group for the job can be calculated, for example, using the equation:

$$\text{Estimated number of application to meet a slate goal} = \frac{\text{The value of the slate goal}}{\text{Job interview rate estimate}}$$

The completion percentage value can indicate a percent of current number of applications out of the estimate number of applications to meet a slate goal. The completion percentage value indicates a progress of achieving a sufficient number of applications to meet a slate goal (e.g., goal of interviewing at least 20 female candidates), and can be calculated for example using the equation:

$$\text{Completion percentage value} = \frac{\text{Number of current application}}{\text{Estimate number of application to meet the goal}}$$

In some instances, the hiring compute device 100 can optionally use the job information updater 108 to generate, after predicting the set of hiring progressions and/or estimating the set of likelihoods, an updated job information based on the original job information for the job opportunity the set of slate goals, and the set of hiring progressions and/the set of likelihoods. In some instances, the hiring compute device 100 can optionally use alternative hiring source different from the set of hiring sources, that are more likely to attract job candidates to meet the slate goals. For example, when a first hiring progression for a female demographic category is below a second hiring progression for a male demographic category, the hiring compute device can target hiring sources that are more likely to introduce female candidates (e.g., a hiring source more popular among female candidates).

In some instances, the hiring compute device 100 can optionally generate, during the hiring process, a set of updated slate goals based on the set of slate goals and the set of hiring progressions. For example, in some instances, the machine learning model 106 can be trained using a training data that includes training labels indicating realistic hiring goals based on hiring progression values. Therefore, the machine learning model 106, once trained using the training data with the realistic hiring goals, can also generate updated slate goals based on initial slate goals set/received from the user of the hiring compute device 100. The hiring compute devise 100 can then substitute, during the hiring process, the set of slate goals with the updated slate goals, which will hopefully result in an improvement to an overall hiring progression for the remaining portion of the hiring process. For example, in some instances, substituting the at least one slate goal with at least one updated slate goal (e.g., a more realistic slate goal) can result in faster progression toward achieving slate goals than the at least one slate goals. The user interface 107 can also display the updated slate goals to the user of the hiring compute device 100. Therefore, substituting the set of slate goals with the updated slate goals can result in a change to a set of slate goals values stored in the memory 102 as well as a change in a set of slate goals values displayed on the display 190, and consequently, influencing the remaining portion of the hiring process.

Although the hiring compute device 100, the compute device 160, and the server 170 are shown and described as singular devices, it should be understood that, in some implementations, one or more hiring compute devices, one or more compute devices, and/or one or more server devices can be used in a hiring system. For example, in some instances, a user of the hiring compute device 100 can provide job information for a job opportunity to the hiring compute device 100, and to a first set of hiring sources including a first set of compute devices (e.g., 100 compute devices, 1000 compute devices, 10,000 compute devices, and/or the like, of recruiters, applicants, and/or the like) and/or a first set of servers (e.g., 100 server devices, 1000 server devices, 10,000 server devices, and/or the like, of recruiting databases, third-party recruitment servers, etc.) to receive a first set of candidate profiles that are stored on the first set of computer devices and/or the first set of severs. The user can also provide a set of slate goals (e.g., a first slate goal for male candidates, a second slate goal for female candidates, etc.) to the hiring compute device 100. The machine learning model 106 of the hiring compute device 100 can be prompted at a first time to predict a hiring progression and/or a likelihood of achieving a slate goal for the job opportunity, based on the job information, the first set of candidate profiles and the set of slate goals.

In some instances, when the hiring progression at the first time and/or the likelihood of achieving a slate goal for the job opportunity are below predetermined thresholds (e.g., below 90% probability to achieve the slate goal for the job opportunity), the hiring compute device 100 can determine to provide job information for a job opportunity to a second set of hiring sources including a second set of compute devices and/or a second set of servers to receive a second set of candidate profiles that are stored on the second set of computer devices and/or the second set of severs In some implementations, the set of candidate profiles received from the hiring sources, the job information provided by the user of the hiring compute device 100, the slate goals set by a user of hiring compute device 100, the updated job information generated by the hiring compute device 100, the updated slate goals generated by the hiring compute device 100, and/or data received, generated, and/or transmitted by the hiring compute device 100 can be time-stamped. For example, in some instances, the slate demographic data extracted from the set of candidate profiles can be timestamped (e.g., by the hiring device 100) to generate timestamped slate demographic data. The timestamped slate demographic data include temporal sequences and therefore can, in some instances, be analyzed by a recurrent neural network model (RNN) to predict the hiring progression and/or the likelihood of achieving a slate goal for a job opportunity.

In some implementations, the hiring compute device 101 can optionally include a candidate selector (not shown) that includes a model (e.g., a neural network model) to select a subset of candidate profiles from the set of candidate profiles. The hiring compute device 101 can optionally further include a bias assessor (not shown) that can generate a bias metric for the model of the candidate selector based on the subset of candidate profiles and the set of candidate profiles, as described in U.S. patent application Ser. No. 17/376,665, filed on Jul. 15, 2021 and entitled "Methods and Apparatus for Assessing Diversity Bias in Algorithmic Matching of Job Candidates with Job Opportunities," which is incorporated herein in its entirety by this reference. In some instances, the user interface 107 can display a visual representation of the bias metric to the user of the hiring compute device 107.

FIG. 2 is a flowchart of a method 200 for predicting a hiring progression toward slate goals based on slate demographic data, according to an embodiment. In some implementations, a hiring compute device (such as the hiring compute device 100 as shown and described with respect to FIG. 1) can be used to perform the method 200. At 201, a set of candidate profiles associated with job information can be received from a set of hiring sources and during a hiring process. The set of hiring sources can include, for example, a job candidate compute device, a recruiter compute device, a server device, and/or the like. In some instances, the set of candidate profiles can be or include, for example, resume documents (e.g., received during a career fair, via mail, etc.). The hiring compute device can be operatively coupled to a scanner (e.g., similar to peripheral device 180 shown and described with respect to FIG. 1) that can generate resume document images that can be further processed (e.g., character recognition, format standardization, etc.) by the hiring compute device. At 202, a first slate goal for a first protected class and a second slate goal for a second protected class can be received during the hiring process. In some instances, the first slate goal and the second slate goal can be provided by a user of the hiring compute device.

At 203, slate demographic data can be extracted from the set of candidate profiles. For example, in some instances, a computer-based search method can be used to extract the slate demographic data. The computer-based search method can search the set of candidate profiles using a lookup table that includes a set of keywords relevant to a variety of demographic groups (e.g., racial demographics, gender demographics, etc.). In some instances, feature extraction machine learning model can be used to extract the slate demographic data. For example, feature extraction machine learning model can be trained to identify, within textual data of the set of candidate profiles, words and/or phrases that can classify a candidate profile from the set of candidate profiles in at least one demographic group.

At 204, a trained machine learning model can be executed based on the first slate goal (e.g., a slate goal for hiring female candidates) and the slate demographic data, to predict a first hiring progression. The trained machine learning model can be generated by training a machine learning model (e.g., with randomly assigned model parameters) on training data including, for example, past slate goal data, past slate demographic data, augmented slate goal data, augmented slate demographic data, and/or the like. At 205, the trained machine learning model can be executed based on the second slate goal (e.g., a slate goal for hiring male candidates) and the slate demographic data, to predict a second hiring progression. In some instances, the first hiring progression and the second hiring progression, each can be or include a numerical value indicating a probability/likelihood of achieving the first slate goal and the second slate goal, respectively.

At 206, an indication of the first hiring progression, an indication of the second hiring progression, and an indication of slate demographic data can be transmitted to a user interface such that the user interface displays (e.g., via a display such as the display 190 shown and described with respect to FIG. 1) a visual representation of the first hiring progression and a visual representation of the second hiring progression. In some instances, the visual representation of the first hiring progress and the second hiring progression can include, for example, bar plots and/or numerical indicators. In some instances, the visual representation of slate demographic data can include, for example, a histogram, a distribution plot, and/or numerical indicators.

At 207, after predicting the first hiring progression and the second hiring progression, updated job information can be generated based on the job information, the first slate goal, the first hiring progression, the second slate goal, and the second hiring progression. In some instances, a job information updater (similar to the job information updater shown and described with respect to FIG. 1) can be used to generate the updated job information. For example, in some instances, the job information updater can include a natural language processing model that can be trained on past slate goals, past hiring progressions, past job information, and/or past updated job information (e.g., manually provided by a user(s) of the hiring compute device).

FIG. 3 is a flowchart of a method 300 for predicting a hiring progression toward a slate goal based on timestamped slate demographic data, according to an embodiment. In some implementations, a hiring compute device (such as the hiring compute device 100 as shown and described with respect to FIG. 1) can be used to perform the method 300. At 301, a first set of slate goals can be retrieved. each slate goal from the first set of slate goals associated with a protected class from a set of protected classes. In some instances, the slate goals can be provided via a compute device (e.g., the compute device 160 as shown and described with respect to FIG. 1) operatively coupled to the hiring compute device.

At 302, first timestamped slate demographic data associated with the set of protected classes can be retrieved. In some implementations, a set of candidate profiles can be received by the hiring compute device and a data preprocessor (e.g., such as the data preprocessor shown and described with respect to FIG. 1) can extract the first timestamped slate demographic data. In some instances, each datum in the slate demographic data can include a timestamp indicating a time and/or date in which a candidate profile from the set of candidate profiles was received.

At 303, the first timestamped slate demographic data and the first set of slate goals can be associated with a set of hiring progression labels to generate labeled training data. In some instances, to generate the training data, the first timestamped slate demographic data and the first set of slate goals can be added (e.g., concatenated) together. In some instances, to generate the training data, the first timestamped slate demographic data can be stored in a first array, the first set of slate goals can be stored in a second array, and the set of hiring progression labels can be stored in a third array. The first array, the second array, and the third array can be stored separately (e.g., in separate memories). Elements of the first array and elements of the second array can have element-wise association to elements of the third array.

At 304, a machine learning model can be trained based on the labeled training data to produce a trained machine learning model. Because the training data includes temporal sequences of the timestamped slate demographic data, in some instances, the machine learning model can be or include a recurrent neural network model (RNN) to predict the hiring progression and/or the likelihood of achieving a slate goal for a job opportunity.

At 305, a second set of slate goals different from the first set of slate goals and second timestamped slate demographic data associated with the second set of slate goals can be retrieved. Each slate goal from the second set of slate goals can be associated with a protected class from the set of protected classes. The second set of slate goals can be associated with the second timestamped slate demographic data in a similar way as the association of the first set of slate goals and the first timestamped slate demographic data.

At 306, the trained machine learning model can be executed based on the second set of slate goals and the second timestamped slate demographic data, to predict a set of hiring progressions for the set of protected classes. In some instances, for the set of hiring progressions, each can be or include numerical values indicating a probability/likelihood of achieving the first slate goal and the second slate goal, respectively. At 307, a visual representation for each hiring progression from the set of hiring progressions can be displayed (e.g., using a user interface similar to the user interface 107 as shown and described with respect to FIG. 1).

FIG. 4 is a schematic description of a user interface of a hiring compute device, according to an embodiment. The user interface (similar to the user interface 107 as shown and described with respect to FIG. 1) can display a set of information using a set of graphical elements (e.g., an information table(s), a plot legend(s), a histogram(s), a progression bar(s), etc.). The set of information can include slate goals, hiring progressions for each slate goal, an overall progress, one or more drop down menus (e.g., to select a job sector), one or more input fields (e.g., to enter customer identification), and/or the like. A shown, the user interface can organize (e.g., in a table) the information, for example, for an easy comparison of different demographic categories. For example, as shown, the table can include female candidate gender column, male candidate gender column, and opt-out column representing candidates that chose not to provide gender information. The user interface can display visual representations of the set of progressions (e.g., displaying one or more progression bars). In some instances, the set of progressions can be color coded and legend of the color coding can be also shown on the user interface. In some instances, the user interface can display a set of inclusion metrics. The inclusion metrics can include, for example, interview rate estimates for a job category, interview rate estimates for a job, estimate number of applications to meet a slate goal, and/or a completion percentage value, as described further with respect to FIG. 1.

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be used, and functional, logical, operational, organizational, structural and/or topological modifications may be made without departing from the scope of the disclosure. As such, all examples and/or embodiments are deemed to be non-limiting throughout this disclosure.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:

receiving, via a processor, during a hiring process, and from at least one remote compute device, a preliminary set of candidate profiles (1) associated with a job description, (2) from a first hiring source, and (3) not having a standardized format;

converting, via the processor, the preliminary set of candidate profiles to a first set of candidate profiles having the standardized format;

receiving, via the processor during the hiring process, a first slate goal for a first protected class and a second slate goal for a second protected class, the first slate goal indicating a target number of individuals to be hired from the first protected class and the second slate goal indicating a target number of individuals to be hired from the second protected class;

extracting, via the processor, slate demographic data from the first set of candidate profiles;

executing, via the processor, a trained machine learning model based on the first slate goal and the slate demographic data, to predict a first hiring progression $x_1$;

executing, via the processor, the trained machine learning model based on the second slate goal and the slate demographic data, to predict a second hiring progression $x_2$;

transmitting, via the processor, an indication of the first hiring progression, an indication of the second hiring progression, and an indication of slate demographic data to a user interface such that the user interface displays a visual representation of the first hiring progression and a visual representation of the second hiring progression;

transmitting, via the processor, an indication of the job description to a third hiring source different from the first hiring source;

generating, via the processor, using a natural language processing model, and after predicting the first hiring progression and the second hiring progression, an updated job description based on the job description, the first slate goal, the first hiring progression, the second slate goal, and the second hiring progression; and receiving, via the processor, a second set of candidate profiles different than the first set of candidate profiles and from a second hiring source (1) different than the first hiring source, (2) determined based on the first hiring progression and the second hiring progression, and (3) more likely to attract job candidates that meet the first slate goal and the second slate goal than the first hiring source.

2. The method of claim 1, wherein the job description is associated with a salary range, the method further comprising:

generating, via the processor and after predicting the first hiring progression and the second hiring progression, an updated salary range based on the salary range, the first slate goal, the first hiring progression, the second slate goal, and the second hiring progression.

3. The method of claim 1, further comprising:

generating, via the processor, an updated first slate goal based on the first slate goal and the first hiring progression, generating, via the processor, an updated second slate goal based on the second slate goal and the second hiring progression; and substituting, via the processor, the first slate goal for the updated first slate goal, and the second slate goal for the updated second slate goal.

4. The method of claim 1, wherein the job description is associated with a job title, the method further comprising:

generating, via the processor, using the natural language processing model, and after predicting the first hiring progression and the second hiring progression, an updated job title based on the job title, the first slate goal, the first hiring progression, the second slate goal, and the second hiring progression.

5. An apparatus, comprising:

a display configured to show a user interface including a visual representation of a hiring progression associated with a job description, and at least one of a visual representation of an inclusion meter, a visual representation of slate demographic data, or a visual representation of a slate goal; and a non-transitory processor-readable medium storing code representing instructions to be executed by a processor, the code comprising code to cause the processor to:

retrieve, via the user interface and during a hiring process, an indication of the slate goal, receive, from a first hiring source and for the job description, a first candidate profile;

retrieve, during the hiring process and based on the first candidate profile, an indication of slate demographic data, augment a first portion of training data to produce a second portion of training data by at least one of applying an image filter, adding noise, translating text, synonym-replacing text, or changing demographic information, a number and a variety associated with the second portion of training data being larger than a number and a variety associated with the first portion of training data;

execute, during the hiring process, a trained machine learning model based on the slate goal and the slate demographic data, to predict the hiring progression, the trained machine learning model trained using the second portion of training data;

transmit, during the hiring process and to the user interface, an indication of the hiring progression and an indication of the slate demographic data to cause the user interface to display the visual representation of the hiring progression and the visual representation of the slate demographic data based on the indication of the hiring progression and the indication of slate demographic data, respectively;

generate, after predicting the hiring progression and using a natural language processing model, an updated job description based on the job description, the slate goal, and the hiring progression;

determine that the hiring progression does not meet the slate goal; and in response to determining that the hiring progression does not meet the slate goal, send the job description to a second hiring source different than the first hiring source and more likely to attract job candidates that meet the slate goal than the first hiring source.

6. The apparatus of claim 5, wherein the code to cause the processor to augment includes code to cause the processor to at least two of apply the image filter, add noise, translate text, synonym-replace text, or change demographic information.

7. The apparatus of claim 5, wherein the code to cause the processor to augment includes code to cause the processor to at least three of apply the image filter, add noise, translate text, synonym-replace text, or change demographic information.

8. The apparatus of claim 5, wherein the code to cause the processor to augment includes code to cause the processor to at least four of apply the image filter, add noise, translate text, synonym-replace text, or change demographic information.

9. The apparatus of claim 8, wherein the trained machine learning was further trained using a set of features that includes at least one of a set of indications of occupation types, a set of indications of job geolocations, a set of indications of industry types, a set of indications of company sizes, a set of indications of job posting timestamps, or a set of indications of past interview rates.

10. The apparatus of claim 5, wherein the job description is associated with a first location and the updated job description is associated with a second location different than the first location.

11. The apparatus of claim 5, wherein the code further includes code to cause the processor to:

retrieve a set of candidate profiles for the job description, the set of candidate profiles associated with the slate demographic data, execute a model to select a subset of candidate profiles from the set of candidate profiles;

generate a bias metric for the model based on the subset of candidate profiles and the set of candidate profiles; and transmit an indication of the bias metric to the user interface such that the user interface is configured to display a visual representation of the bias metric.

12. The apparatus of claim 11, wherein the code further includes code to cause the processor to:

update the job description based on at least one of the bias metric or the hiring progression.

13. The apparatus of claim 5, wherein the code further includes code to cause the processor to:

generate an updated slate goal based on at least the slate goal and the hiring progression, and substitute the slate goal for the updated slate goal.

14. The apparatus of claim 5, wherein the slate goal indicates a target number of individuals to be interviewed from a protected class.

15. A method, comprising:

retrieving a first set of slate goals, each slate goal from the first set of slate goals indicating a target number of individuals to be hired from a protected class from a set of protected classes;

retrieving first timestamped slate demographic data associated with the set of protected classes;

associating the first timestamped slate demographic data and the first set of slate goals with a set of hiring progression labels to generate labeled training data;

training a decision tree gradient boosting model based on the labeled training data to produce a trained decision tree gradient boosting model;

retrieving (1) a second set of slate goals different from the first set of slate goals and (2) second timestamped slate demographic data associated with the second set of slate goals, each slate goal from the second set of slate goals indicating a target number of individuals to be hired from a protected class from the set of protected classes;

executing the trained decision tree gradient boosting model based on the second set of slate goals and the second timestamped slate demographic data, to predict a set of hiring progressions for the set of protected classes;

displaying a visual representation for each hiring progression from the set of hiring progressions;

determining that at least one hiring progression from the set of hiring progressions does not meet a slate goal from the second set of slate goals associated with the at least one hiring progression;

sending a job description associated with the at least one hiring progression to a hiring source more likely to attract candidates that will satisfy the slate goal associated with the at least one hiring progression; and generating, after predicting the set of hiring progressions and using a natural language processing model, an updated job description based on the job description, at least one of the first set of slate goals or the second set of slate goals, and the set of hiring progressions.

16. The method of claim 15, further comprising:

calculating an overall hiring progression from the set of hiring progressions using:

$$\frac{n}{\sum_{i=1}^{n} \frac{1}{x_i}}$$

wherein $x_i$ represents a hiring progression from for a protected class from the set of protected classes.

17. The method of claim 15, further comprising:

extracting a first set of features from the first timestamped slate demographic data, and a second set of features from the second timestamped slate demographic data;

training the decision tree gradient boosting model based on the first set of features, the first set of slate goals, and the set of hiring progression labels, to produce the trained decision tree gradient boosting model; and executing the trained decision tree gradient boosting model based on the second set of features and the second set of slate goals to produce the set of hiring progressions for the set of protected classes.

18. The method of claim 17, wherein the first set of features and the set of features include at least one of a set of indications of job occupation types, a set of indications of job geolocations, a set of indications of industries, a set of indications of company sizes, a set of indications of job posting timestamps, or a set of indications of past interview rates.

19. The method of claim 15, further comprising:

generating a set of updated slate goals for the set of protected classes based on at least the second set of slate goals and the set of hiring progressions.

* * * * *